Oct. 13, 1964    V. L. OTT ETAL    3,152,431
LAWN MOWER
Filed May 2, 1962    4 Sheets-Sheet 1
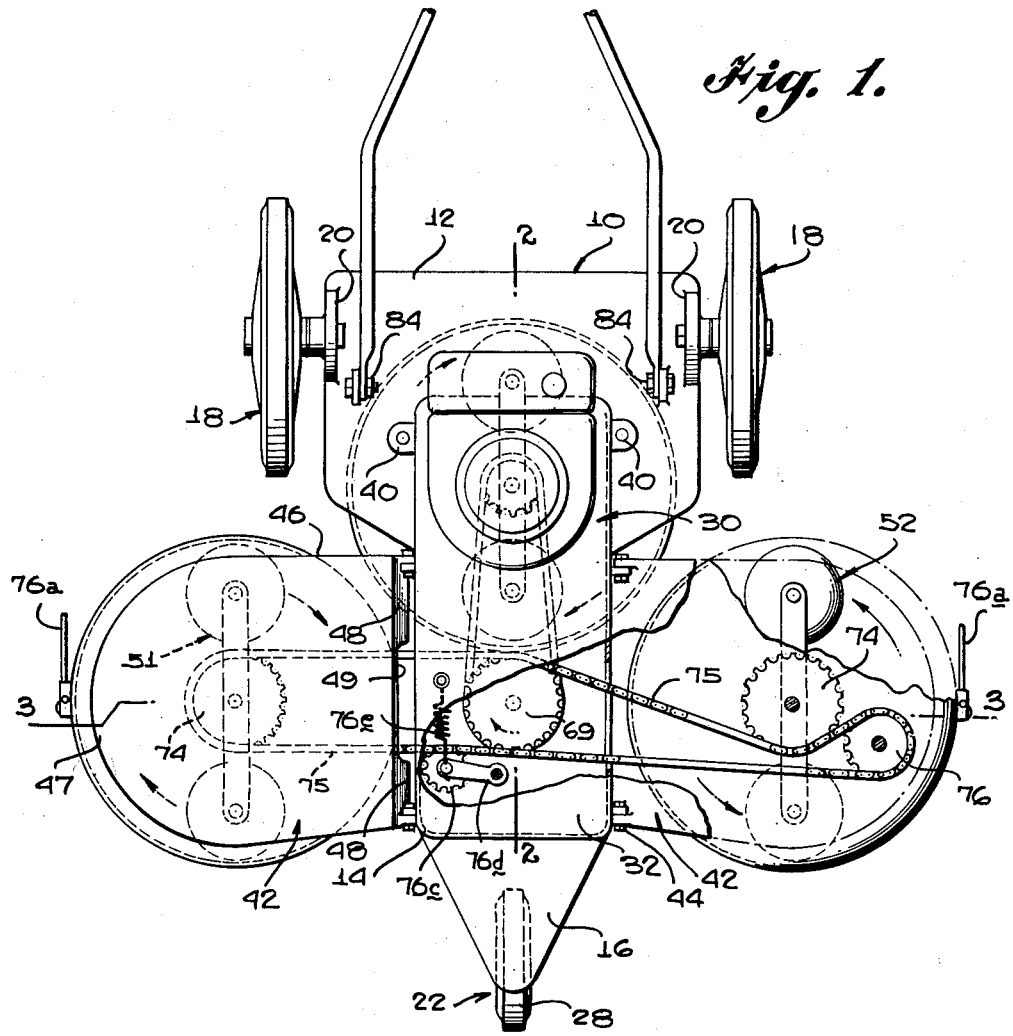
Fig. 1.
Fig. 4.
INVENTORS
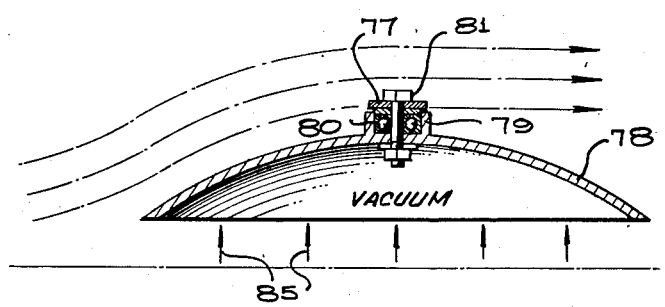
Vivian L. Ott &
John Branch Beaman, Jr.
BY: Shumaker and Mattare
ATTORNEYS

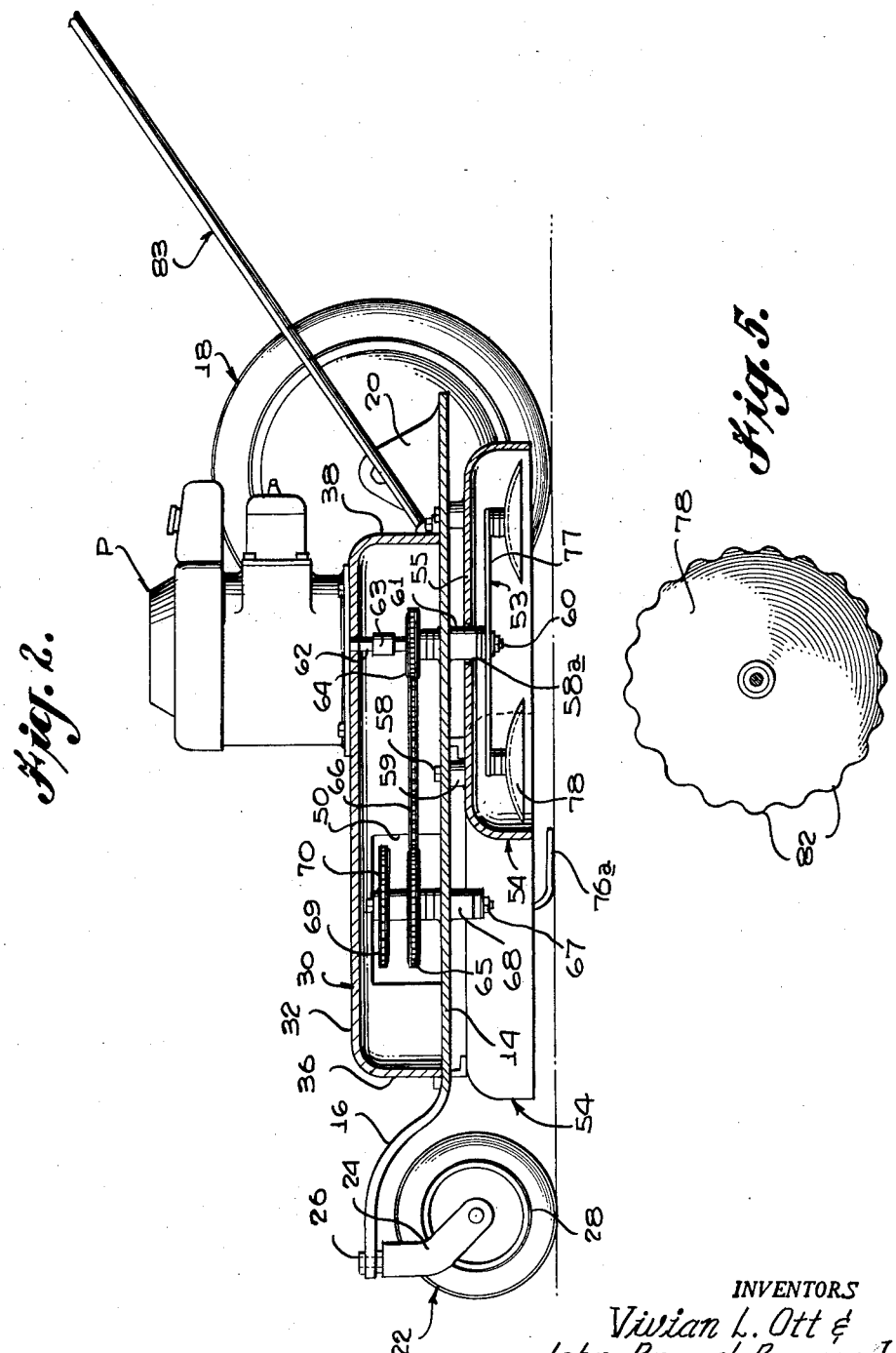

INVENTORS
Vivian L. Ott &
John Branch Beaman, Jr.

BY:
ATTORNEYS

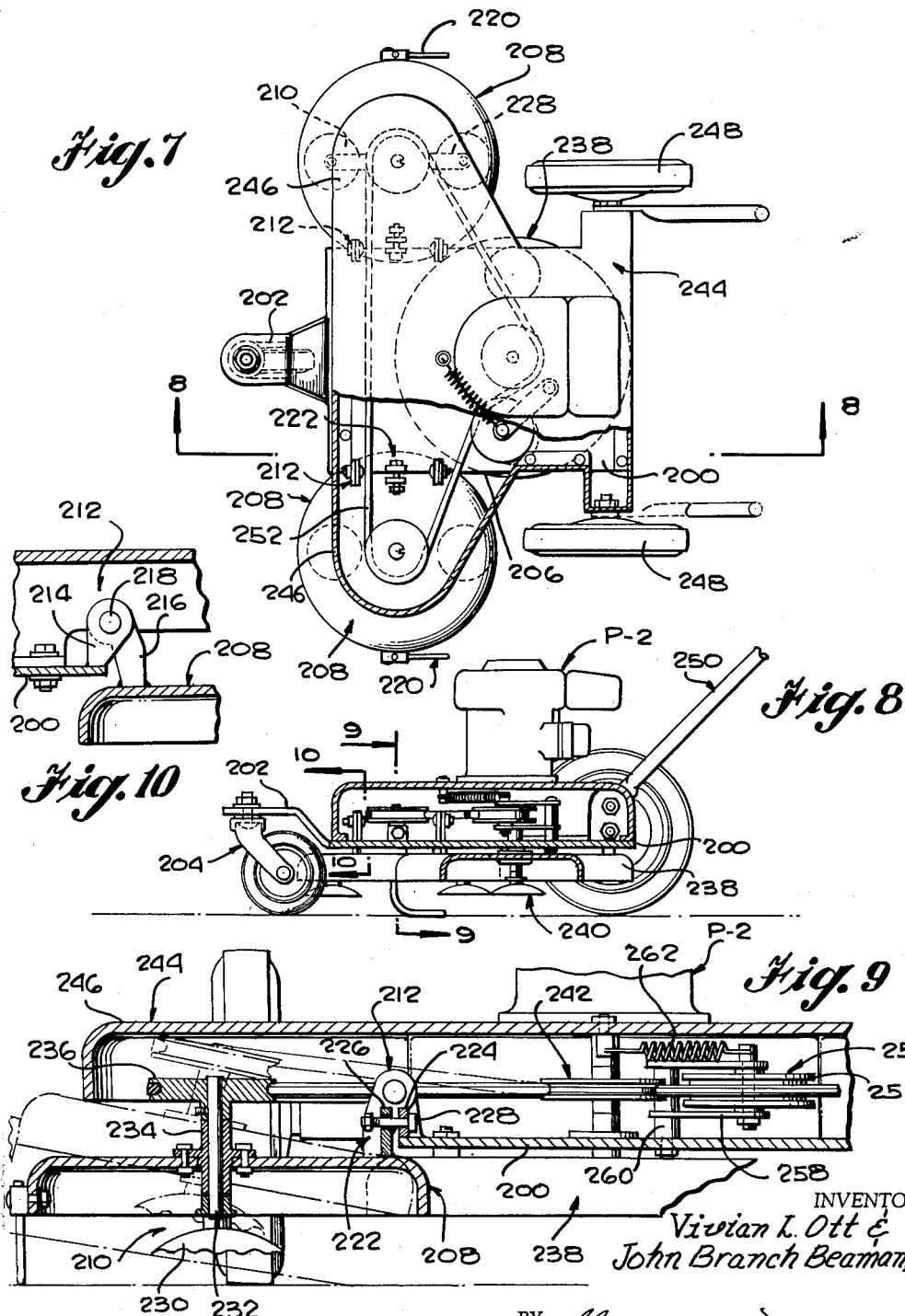

United States Patent Office 3,152,431
Patented Oct. 13, 1964

3,152,431
LAWN MOWER
Vivian L. Ott, 6100 Sylvan Ave., Norfolk, Va., and John Branch Beaman, Jr., 815 Church St., Ahoskie, N.C.
Filed May 2, 1962, Ser. No. 191,925
8 Claims. (Cl. 56—25.4)

This invention relates to the class of mowing machines and is directed particularly to improvements in machines for this purpose which are designed primarily for mowing lawns adjacent to residences or lawns of parks or other small areas, although the invention is not restricted in any manner to such uses.

The mowing machine of the present invention is of the so-called rotary type, the conventional form of which uses rigid blades secured directly to a rotating shaft or attached in some other way to a rotary shaft for turning the blades in a horizontal plane. It is well known that in such conventional rotary type of mowing machine where rigid cutter blades are swung or rotated around a vertical axis, there is the ever present danger of an accident to the user of the machine resulting either from the machine throwing a blade or from the blade striking some hard object such as stone or the like and causing the blade to be broken so that the broken part may fly and injure the operator. It is accordingly a particular object of the present invention to provide a new and improved form of mowing machine which operates upon the rotary blade principle but wherein the blades are designed and supported to function in a unique manner whereby to efficiently cut grass or other vegetation and at the same time remove the risk of accident to the operator of the machine.

It is also a feature of rotary mowers of the presently used type employing rigid cutter blades, that such rigid cutter blades are rotated at high speed and consequently if the blade should break or be thrown off as a result of coming loose or should strike some hard object which could be projected outwardly from the machine, the high speed at which the blade is rotating further adds to the danger of an operator being seriously injured, either by a freed blade or a portion of a broken blade, or by an object struck and thrown up from the ground by the blade. It is accordingly a further object of the present invention to provide a mowing machine operating upon the rotary cutter principle, wherein the construction is such that the cutting elements may be revolved or rotated around the axis of the driving shaft at a relatively low speed without at the same time reducing the mowing efficiency of the machine.

Another object of the invention is to provide a grass cutting or mowing machine operating upon the rotary principle wherein the cutting elements or blades are in the form of discs which are supported for rotation in multiple and in a common plane about a common axis, and which elements are additionally supported so that each may rotate freely independently of the common rotary support, whereby the independently rotatable discs will be turned or rotated through contact with grass or other vegetation thereby giving to the machine certain advantages over rotary rigid cutter blade employing machines, such as the improbability of a blade breaking or being thrown out or of striking an object on the ground in such a manner as to project the object outwardly.

A still further object of the invention is to provide a mowing machine having rotatable cutting elements in the form of discs supported for multiple rotation about a common axis with a novel means for supporting the discs in multiple or in groups so that the groups of discs will readily follow the contours of the ground on which the machine is operating, without digging into the ground.

It is a further object of the invention to provide a mowing machine wherein, in one embodiment thereof, the groups of rotary discs are supported in a balanced relationship on opposite sides of a carrier body or frame so that the machine may be readily supported on three wheels, one of which is in advance of the other two and on the longitudinal center of the machine and will automatically maintain a straight line of travel as it is pushed forward in use.

The invention broadly contemplates the provision of a wheel supported frame structure having a suitable prime mover mounted thereon for delivering rotary power to the rotating units of the machine. The frame supports in one embodiment thereof a number of groups of rotary units, each such group including at least two or more rotatable cutting discs. Such rotatable cutting discs are supported for independent rotation and for rotation as a group around a common vertical axis, suitable driving means being connected between the prime mover and the rotary groups of cutting elements.

In the said one embodiment where the several groups of cutter elements are employed, two of the groups are mounted upon opposite sides of the machine frame for relative up and down movement of axes extending longitudinally of the machine and maintained in a balanced relationship by means of the driving chains or connections between the rotatable groups and a centrally located power transmitting shaft. By reason of the balanced relationship of the groups of cutters on opposite sides of the machine body, use may be made of a single forward supporting caster wheel and the direction of rotation of the two oppositely positioned groups of cutter elements is such that the machine as it is pushed forward will maintain a straight line of movement.

The invention will be best understood from a consideration of the following detailed description taken in connection with the accompanying drawings forming a part of this specification with the understanding, however, that the invention is not confined to a strict conformity with the showing of the drawings but may be changed or modified so long as such changes or modifications mark no material departure from the salient features of the invention as defined by the appended claims.

In the drawings:

FIG. 1 is a view in top plan of a mowing machine embodying groups of cutter elements constructed in accordance with the present invention, with portions of the machine body and a housing for one group of cutter elements being broken away.

FIG. 2 is a view partly in longitudinal section and partly in side elevation of the machine shown in FIG. 1, the section being taken substantially on the line 2—2 of FIG. 1.

FIG. 4 is a sectional view taken radially through one cutter element and illustrating diagrammatically air movement as created by the rotary element.

FIG. 5 is a top plan view of a cutter element showing the serrated cutter edge thereof.

FIG. 7 is a view in top plan of a modified construction, portions of the mechanism housing being broken away to illustrate the hood mounting and hinge stop means.

FIG. 8 is a longitudinal section taken in a vertical plane substantially on the line 8—8 of FIG. 7.

FIG. 9 is a partial section, on an enlarged scale, taken in a vertical plane and in the transverse direction, substantially on the line 9—9 of FIG. 8.

FIG. 10 is a sectional detail taken substantially on the line 10—10 of FIG. 8.

Figure 3:
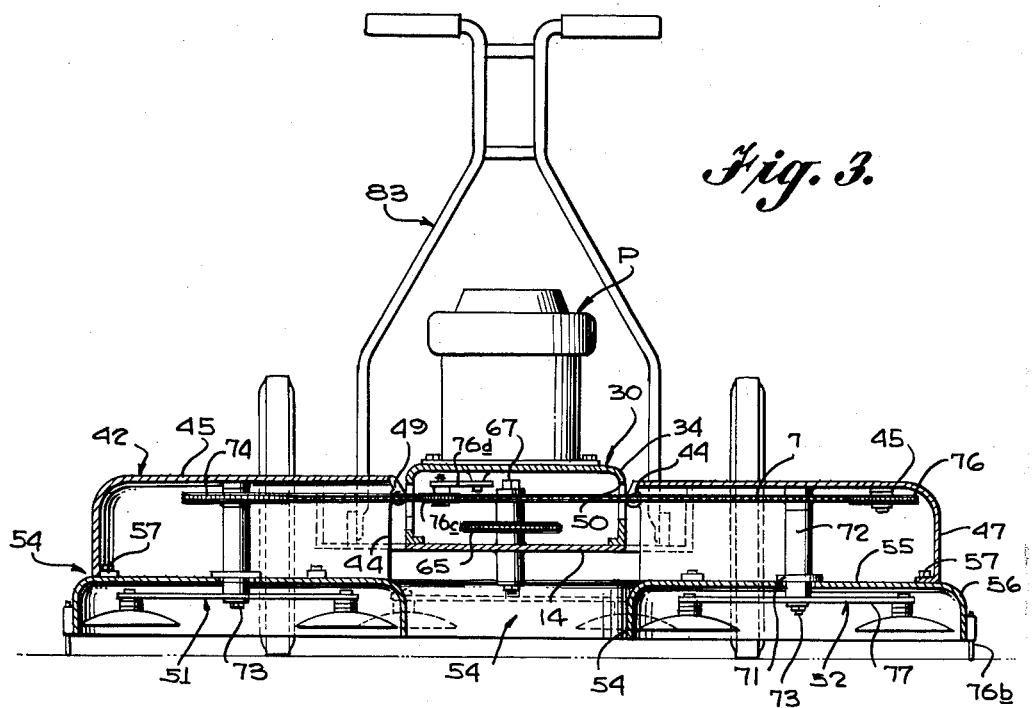
FIG. 3 is a transverse sectional view taken substantially on the line 3—3 of FIG. 1.

Referring now particularly to the drawings, and especially to FIGS. 1 to 3, there is illustrated one form or embodiment of a machine structure with which the rotary cutting units of the present invention are shown. In these figures the numeral 10 generally designates the machine frame or body which, as shown, is in the form of a flat plate or platform embodying a rear relatively wide portion 12 and a narrow forwardly extending portion 14 which joins an upwardly and forwardly curving neck 16.

The wide rear portion 12 has rotatably attached to opposite sides thereof by suitable means, a pair of rear supporting wheels each of which is generally designated 18. Any suitable means may be employed for attaching the wheels to the opposite sides of the portion 12 of the body, the means here shown comprising upstanding ears or lugs 20 each located adjacent to one side edge of the body and supporting a suitable axle, not shown, which projects laterally outwardly and upon which the adjacent wheel is rotatably mounted, it being understood, of course, that the wheels 18 rotate on a common axis extending transversely of the rear of the body.

The forwardly extending neck portion 16 of the machine body is supported by a caster wheel which is generally designated 22 and which comprises the conventional yoke 24 pivotally supported as at 26 and the wheel body 28 rotatably supported in the yoke in the well known manner.

The numeral 30 generally designates an elongate housing which encloses a portion of the mechanism as hereinafter described. This housing comprises a top wall portion 32 and longitudinal side wall portions 34 connected at the forward and rear ends of the housing to forward and rearward end walls 36 and 38 respectively. Any suitable means may be employed for securing the mechanism enclosing housing 30 to the body as, for example, there may be provided the laterally projecting ears 40 bolted to the body in the manner shown in FIG. 1.

In addition to the mechanism housing 30 which lies on the longitudinal center of the machine body, there are provided the laterally projecting housing wings 42. Each of these wings has an inner end which is pivotally attached to a side wall 34 of the housing 30, such pivots for each housing wing 42 being designated 44. Thus it will be seen that each housing wing is mounted upon a side of the main housing 30 for up and down swinging movement on an axis extending lengthwise of the machine. Also the housing wings project in opposite directions from the opposite sides of the housing 30 in alignment transversely of the machine.

Each of the housing wings 42 comprises a top wall 45 and depending side and outer end walls 46 and 47 respectively. The under sides of the housing wings are open. There is also an inner end wall 48 for each housing wing, which has a relatively wide central opening 49 for the passage therethrough of driving mechanism as hereinafter described and these openings 49 are aligned with openings 50 in the adjacent side walls 34 of the central housing portion 30.

Each of the numerals 51, 52 and 53 designates a rotary cutting unit constructed in accordance with the present invention.

Each of the rotary cutting units is encased in a downwardly opening hood 54.

Each housing wing 42 supports on its open under side one of the hoods 54 as shown in FIG. 3, each of the hoods 54 comprising a circular top wall 55 and a depending flange or side wall 56.

The bottom edges of the side and outer end walls 46 and 47 of each housing wing are secured in a suitable manner to the top wall of a hood 54 as, for example, by means of lugs 57 carried by the housing wings and bearing upon and secured to the top wall of the hood by screws or bolts.

The cutting unit 53 is enclosed in a downwardly opening circular hood 54 as shown in FIG. 2. This hood is positioned upon the under side of the rear portion 12 of the machine body 10 and the top walls 55 of this hood has means in the form of bolts or the like 58 passing through the body 10 and connected to the top of the hood in a suitable manner as, for example, by engagement in upwardly projecting lugs 59. However, any suitable means may be employed for securing this hood in position.

The top wall portion 55 of each of the hoods 54 is provided with a central opening 60 for the extension therethrough of a suitable rotary power transmitting shaft as hereinafter described.

As will be readily apparent upon reference to FIGS. 2 and 3, the three hoods 54 are supported in a common plane and below the plane of the body 10 but the laterally positioned hoods 54 which are attached to the housing wings 42 are intended to have up and down movement with the housing wings while the rearwardly positioned hood is permanently fixed by the bolts 58.

It will also be apparent upon reference to FIG. 1 that the rearward one of the hoods 54 has the center thereof in the vertical longitudinal central plane of the machine body and that the diameters of the hoods are such that the cutting units housed therein will be arranged so that they will cooperate to cut a wide swath in the grass or vegetation over which the machine is operating as the forward cutting units enclosed in the forward and laterally positioned hoods will overlap the path followed by the cutting unit in the centrally and rearwardly located hood.

The hood 54 overlying and enclosing the unit 53, which unit is the rearmost one, has extending downwardly thereinto through the opening 58a thereof, a shaft 60 which extends upwardly through a mounting 61 carried by the body 14, and projects above the body into the housing portion 30 as shown in FIG. 2.

Mounted upon the top of the housing 30, or otherwise suitably supported over the housing and the machine body is a prime mover P here conventionally illustrated as an internal combustion engine, although it may be an electric motor and this prime mover has a power delivery shaft 62 which extends downwardly and is in alignment with the shaft 60 with which it is operatively coupled in a suitable manner, as indicated at 63. Thus upon rotation of the shaft 62 the cutter unit 53 will be rotated within in the hood in an obvious manner.

The upper end of the shaft 60 carries a suitable wheel such as the sprocket gear wheel 64 for transmitting power to a gear 65 by means of a chain drive 66 or the like. The gear 65 is mounted upon and secured to a vertical shaft 67 rotatably supported in a suitable bearing sleeve 68 carried by the body portion 14. The shaft 67 is positioned on the longitudinal center of the body portion 14 and it carries and has secured thereto a sprocket gear 69 transmitting rotary power, in the manner about to be described, laterally to the outlying rotary cutter units 51 and 52.

The hoods 54 covering and enclosing the cutter units 51 and 52 are of duplicate construction, each having in the center thereof an opening 71 for the extension therethrough of a bearing sleeve 72 having rotatably mounted therein the shaft 73 upon the lower end of which the cutter unit is secured.

A gear wheel 74 is mounted upon the upper end of each shaft 73 as shown, and rotary power is delivered to the gear wheels 74 by the driving chain 75 which, as shown in FIG. 1, has a flight angled across and in toothed connection with the gear wheel 69 which is secured to the power transmitting shaft 67.

The power transmitting chain 75, as shown, extends across from one cutter unit gear wheel 74 to the opposite one so that the one flight of the chain as mentioned, will make driving connection with the driven gear wheel 65, and the other flight may also engage this gear wheel as shown.

In order to accomplish an object of the present invention the said one flight of the chain 75 which is operatively engaged with the wheel 69 does not pass around one of the gear wheels 74, but extends across and is in engagement with that wheel on one side only as shown in FIG. 1, where it will be seen that the said one flight of the chain engages one side of the right hand gear wheel 74. This one flight is then passed around an idler gear 76 which is rotatably mounted on the underside of the top wall of the adjacent or overlying housing wing 42 as shown in FIGS. 1 and 3. It will be seen that with this arrangement clockwise rotation of the gear 65 which is directly connected with the prime mover gear by the chain 66, will effect transmission of counterclockwise rotation to one of the cutter units and the clockwise rotation to the other cutter unit.

It will also be noted upon reference to FIG. 3 particularly, that the chain 75 which transmits power from the driven sprocket wheel 69 lies in a horizontal plane common to the plane of the pivot mountings 44. Thus, with this mounting arrangement the chain 75 will be maintained in a substantially taut condition and exert a proper tension upon the housing wings and the hoods and the cutter units connected with the hoods and lying therebeneath when all of these parts are disposed horizontally in a common plane.

The outermost lateral side portion of the flange of each hood 54 has pivotally attached thereto a short runner 76a which has a short vertical portion 76b connected to the hood flange for turning on a vertical axis. These runners assist in supporting the hoods at the desired elevation and the hoods are permitted to rise slightly by reason of the pivot mountings 44, when the runners 76a pass over rises in the underlying ground surface.

Suitable means may be provided for taking up any slight slackening in the cross chain 75 in the event that the hoods either singly or together rise slightly as stated. One such means may comprise an idler gear 76c supported in a suitable manner for movement relative to one flight of the sprocket chain 75 as, for example, upon a pivoted arm 76d which may be mounted upon the top 32 of the housing 30. However, obviously any other mounting may be employed which will permit the idler sprocket gear 76c to be drawn continuously into operative connection with the chain 75, by a suitable tensioning spring such as that indicated at 76e.

Thus it will be seen that clockwise rotation of the gear wheel 65 which is directly connected with the prime mover gear will transmit counterclockwise rotation to one of the cutter units and clockwise rotation to the other.

The cutter units 51, 52 and 53 are of identical design or construction and therefore a description of one will apply to all and the same reference characters will be used in connection with the description of the three units.

Each of the cutter units comprises a cutting element supporting bar 77 having a suitable opening midway of its ends to receive the vertical shaft to which it is attached as, for example, in FIG. 2 the bar 77 has the shaft 60 extending therethrough while, as shown in FIG. 3, the bar 77 has the lower end of a shaft 73 extended therethrough and attached or secured thereto. At each of the ends of the bar 77 of the cutter unit there is mounted on or attached to the bar a disc which forms the cutter element and which disc is generally designated 78. This cutter element or disc 78 is of arcuate form or dished as best seen in FIG. 4 and it is attached to the end of the bar with the concave face or side directed downwardly. In this figure the cutter element is shown as having a bearing cup 79 extending upwardly from the convex side thereof and at its center to receive a bearing unit 80 and passing through the bearing unit and coupling the cutter element to the end of the bar 77 is the bolt or pin 81. Thus it will be seen that the disc 78 or cutter element is free to rotate on the end of its supporting bar.

In addition to having its periphery or edge sharpened the cutter disc 78 has this sharpened edge serrated as indicated at 82 in FIG. 5. This serration of the edge performs a double function of improving the cutting ability of the disc and in causing the disc to be rotated about the pivot pin 81 as it is rotated in the unit around the common center of rotation for the unit, which center of rotation is provided by the supporting shaft for the unit, namely the shaft 60 or the shaft 73.

Any suitable means may be provided for moving the mowing machine over the ground and such means is here shown as comprising a conventional double shaft handle bar which is generally designated 83, having the two sides or the shafts thereof pivotally attached to the wide rear portion 12 of the body 10 as indicated at 84.

It will be noted upon reference particularly to FIG. 1 that the gear or pulley wheel 64 which transmits rotary power to the cutter units is of smaller size than the gears 69 and 74. This arrangement provides for slow cycle rotary cutting with less power and reduced possibility of accidents since the slower rotation of the cutting units results in substantially eliminating the possibility of any objects lying loose upon the ground being thrown outwardly if struck by the cutting elements. The construction and operation of the mower also is such that the rotating dish shaped cutting elements 78 create an updraft, as indicated by the arrows 85 in FIG. 4, to obtain a cleaner cutting operation and also, in view of the fact that the cutting discs or blades of disc form being supported to revolve freely on their carrying arms 77 will be made to spin as the serrated edges of the blades come in contact with grass or other material. Thus the momentum of the spinning blades together with the rotation of the units will not only more efficiently cut grass, weeds, vines or small growth, but the possibility of the blades throwing loose objects from the ground is reduced as above stated since the blades will merely turn from such objects instead of knocking them outwardly as would be done by a stiff or rigid cutter blade. This will also reduce shock to the parts and prevent breakage.

While it is preferred that the cutter blades be formed with serrated cutting edges, they may also be provided to have a smooth or unserrated cutting edge if desired.

Another novel feature of the present invention resides in the contrary wise rotation of the laterally positioned or outlying cutter units. This arrangement prevents the caster wheel at the forward end of the machine body from tending to swing to one side or the other of the line of travel, thus making it much easier to control the machine movement over the lawn surface.

A further feature of the rotary cutter elements resides in the creation of air currents over the top of the element or over the convex top surface which could tend to project cuttings laterally and thus prevent clogging of the cutter.

Figure 6:
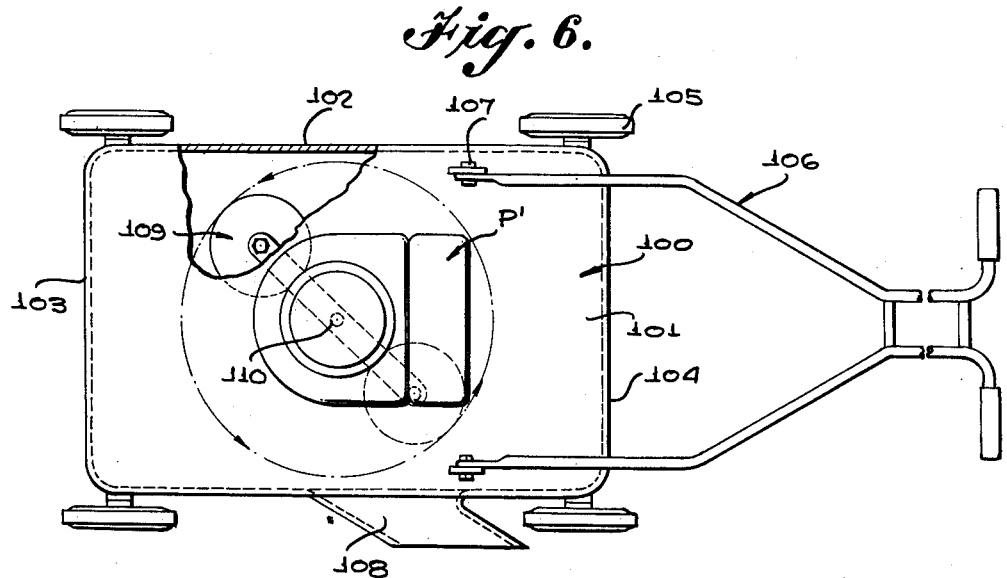
FIG. 6 is a view in top plan of a second embodiment showing a conventional four wheel type of mower employing a single rotary unit, portions of the body structure being broken away.

While there has been described an embodiment of the invention in a three cutter unit structure it is contemplated to employ the rotary cutter unit singly in a housing as illustrated in FIG. 6. In this figure there is shown a conventional type of rectangular housing which is generally designated 100. This housing embodies a top wall 101 and depending side, front and rear wall flanges 102, 103 and 104 respectively.

The housing is illustrated as being supported upon the usual four supporting wheels located two at the front and two at the rear and each of which wheels is designated 105 while the handle for controlling the movement of the machine is generally designated 106 and may be of the same form as that hereinbefore illustrated and described, having the side members thereof pivotally attached to the top 101 of the housing as indicated at 107.

One side wall flange of the housing is provided with a lateral outlet or discharge chute 108 from which the cuttings can be projected by the revolving cutter unit which is here generally designated 109. In this single cutter unit structure the wall flanges for the body 100 form the hood or housing for the revolving cutter. Thus as the cutter elements revolve around the center of rotation provided by the supporting shaft 110 the grass and other material as it is cut by the other elements will be projected laterally to and through the outlet 108.

The reference character P' here designates the motor or prime mover which is operatively connected with the cutter unit driving shaft for rotating the latter on the axis of the supporting shaft 110.

FIGS. 7 to 10 inclusive illustrate another modified embodiment of the invention.

In this other modification of the three cutter unit mower structure, the numeral 200 generally designates the body plate which has the forwardly extending neck portion 202, to the underside of which is pivotally attached the caster wheel unit which is generally designated 204 and which is of the same design as the unit 22 and accordingly no further detailed description of this unit is considered necessary.

The numeral 206 designates the longitudinal side edges of the body plate 200 and to each of these side edges there is attached, in a manner about to be described, a hood 208 corresponding to the hereinbefore described hoods 54 and which houses a rotary cutter unit 210 of a corresponding structure to the unit 51.

The mounting for each of the hoods 208 comprises a pair of hinge units each of which units is generally designated 212. These units are disposed in longitudinally spaced relation along the edge 206 of the body as clearly shown in FIG. 7, and each hinge unit comprises the two upstanding arms or hinge ears 214 and 216 secured respectively upon the body plate 200 and the hood 208 and which upstanding hinge arms or ears are pivotally coupled together as at 218, as illustrated particularly in FIG. 10. Thus, the hoods 208, which are in alignment tranversely of the body 200, are supported from the adjacent edges of the body for up and down swinging movement on parallel axes extending longitudinally of the body.

Each of the hoods 208 has attached to the outer side thereof, a ground engaging runner 220, which is mounted for pivotal movement on a vertical axis so that the runner will follow the turning movements of the hoods as the mower is being used.

The upward swinging of the hoods is limited by the stop means which is generally designated 222. This stop means is here illustrated as comprising the two adjacent upstanding ears 224 and 226 carried respectively by the body 220 and the hood and being loosely coupled together by the nut and bolt coupling 228. This coupling, being relatively loose, will permit slight upward swinging of the hood as will be readily apparent from reference to FIG. 9.

The hinge stop 222, for each hood 208, is located between the hinge units which couple the hood with the body as shown in FIG. 7.

Each of the hoods 208, which is peripherally flanged as clearly shown in FIG. 9, covers and houses a cutter unit 210 and which cutter unit comprises a bar 228 which supports at each end a cutter disc 230 for rotation about a vertical pivot or axis not illustrated, but which may be of the same construction as shown in FIG. 4.

The cutter disc supporting bar is secured mid-way of its ends to the lower end of a vertical shaft 232 which is here illustrated as extending upwardly through a supporting sleeve 234 which is secured to and extends centrally through the hood 208.

The upper end of the shaft 232 carrier a V-belt pulley 236.

The numeral 238 designates a stationary hood which is fixed to the underside of the body 200 and corresponds to the stationary hood 54 shown in FIG. 2 as fixed to the underside of the body 10. This hood 238 is centrally located between and slightly rearwardly of the hoods 208 as shown and houses a cutter unit 240, the disc supporting bar of which is attached to a vertical shaft, not shown, but corresponding to the shaft 232 which extends upwardly through suitable guide sleeves and is secured to the hub portion of the V-belt pulley 242.

Mounted upon the body plate 200 is a housing which is generally designated 244. This housing covers the entire body plate 200 and at its forward part is extended laterally into the hood covering wings 246.

The housing 244 is here shown as serving as a support for the motor or engine or prime mover which is generally designated P-2 and the prime mover is operatively coupled through a suitable shaft with the shaft supporting the pulley 242, the prime mover being mounted directly above this pulley as is clearly shown in FIGS. 7 and 9.

While any suitable means may be employed for mounting rear supporting wheels on the body 200, the rear wheels here shown and designated 248 are illustrated as pivotally mounted on the housing at the sides thereof and means is also provided for attaching a control handle 250 the lower portion only of which is illustrated, to the machine, the attachment here being shown as being to the housing although the handle may be attached to any other part as may be desired.

The motor driven pulley 242 and the pulleys 236 in the hoods, are connected by a single V-belt which is generally designated 252. As shown this belt has one flight running directly from one pulley 236 across to the other while the other flight then runs rearwardly and across the rear side of the motor driven pulley 242. Thus a single belt or drive connection is employed between the several pulleys.

The numeral 254 designates a slack take-up or belt tightener which comprises an idler pulley 256 supported between a pair of arms 258 and which arms are in turn supported for swinging movement about a vertical axis as indicated at 260.

A tightening spring 262 connects the outer or pulley carrying ends of the arms 258 with a fixed part of the structure, here shown as being the housing 244 whereby a constant pull is maintained on the idler supporting arms to draw the idler pulley tightly against the outer side of the pulley belt 252. Thus any slackening of the belt 252 caused by the rising of a hood 208 and the cutters carried thereby, will be taken up to maintain a constant positive driving of the cutters.

It will be apparent from the foregoing that the present invention embodies an entirely new concept in the mowing art. That is, there is a completely new method involved in the manner in which the mowing operation is carried out, as well as an entirely new machine structure for carrying out the method. In other words the new method of the present invention consists in rotating circular cutters, such as cutter discs, around a center while supporting such cutter discs for turning movement on their own centers or vertical axes and also effecting the formation of a reduced pressure area beneath the rotating disc cutters and the creation of an updraft whereby there is obtained a cleaner cutting action and, as a result, a better appearing lawn surface.

The specific cutter unit comprising the bar 77 having the cutter discs rotatably attached to the ends thereof form the subject matter of a separate application for patent.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equiva-

We claim:

1. A mowing machine comprising, a body, wheel means supporting the same, a prime mover carried by the body, a pair of cutter units having the body therebetween, means supporting each of said units for up-and-down swinging movement on an axis extending longitudinally of the body, each of said cutter units embodying a bar member, a cutter element of circular form centrally attached to each end of said bar upon the underside thereof for free spinning rotation, a substantially vertical shaft for each cutter unit secured at one end to the cutter unit bar midway between the ends of the latter and supported for rotation by the cutter unit supporting means, and a driving coupling between each of said shafts and the prime mover, said cutter element being of dished form with a convex outer surface terminating in a peripheral cutting edge and being positioned with the concave side directed downward.

2. In a mowing machine, a cutting disc having a convex side and a concave side, means forming a cutting edge at the periphery of the disc, free turning bearing means rotatably supporting the disc from the convex side thereof for rotation on its radial center about a substantially vertical axis with the concave side directed downwardly, means supporting the disc together with its supporting means for rotation about a center and in a substantially horizontal plane, and power means operatively coupled with the second mentioned means only for rotating the latter said disc being adapted to be rotated freely on said free turning supporting means solely by peripheral impact against vegetation being cut thereby.

3. A mowing machine comprising a wheel supported platform, a housing structure thereon, having a front and a rear and embodying a central part and lateral, outwardly extending wing parts, said wing parts having open downwardly directed undersides, a prime mover on and in the longitudinal center of the housing, a vertical drive shaft operatively coupled to and extending downwardly from said prime mover to and through the platform, a downwardly opening circular hood beneath the rear of the platform, means supporting the hood, lateral downwardly opening circular hoods each positioned beneath the open underside of a wing, means supporting each of said lateral hoods, a rotary shaft joined to and extending upwardly from the center of each lateral hood, means whereby each of said lateral hoods may swing vertically on an axis extending longitudinally of the platform, a cutter element carrying bar secured midway of its ends to each of said vertical shafts, driving means operatively connecting said vertical shafts with and for simultaneous rotation by said prime mover, a cutter element attached to each end of each of said carrying bars, each cutter element consisting of a peripherally sharp disc positioned upon the underside of its carrying bar, the attachment of each disc to its carrying bar being by means of a vertical pivot and anti-friction means located at the top axial center of the disc, and said discs each being adapted by said pivot and anti-friction means to be rotated solely by peripheral impact of the disc against vegetation as said carrying bars are rotated to move the discs of each bar in a circular path, each of said discs being of concavo-convex form and being supported with the concave side directed downwardly.

4. The invention according to claim 3, wherein the said means whereby each of said lateral hoods may swing vertically, comprises a hinge connection between said wings and the central part of the housing, the said lateral hoods being secured each to the overlying wing.

5. The invention according to claim 3, wherein the said means whereby each of said lateral hoods may swing vertically, comprises a hinge connection between each lateral hood and the adjacent side of the platform.

6. The invention according to claim 5, with a loose coupling between each lateral hood and the platform which is adapted to limit the downward swinging of the hood.

7. The invention according to claim 3, wherein the said driving means operatively connecting said vertical shafts with and for simultaneous rotation by said prime mover comprises an endless flexible element and wheel elements on the said vertical shafts and having said endless flexible element trained therearound.

8. The invention as defined by claim 2 wherein the said free turning bearing means is an anti-friction means.

References Cited in the file of this patent

UNITED STATES PATENTS

| | | |
|---|---|---|
| 1,248,330 | Huish | Nov. 27, 1917 |
| 1,831,681 | Miller | Nov. 10, 1931 |
| 2,071,872 | Cockburn | Feb. 23, 1937 |
| 2,506,215 | Hays | May 2, 1950 |
| 2,529,870 | Golasky | Nov. 14, 1950 |
| 2,592,755 | Soenksen | Apr. 15, 1952 |
| 2,743,567 | Martin | May 1, 1956 |
| 2,972,850 | Ariens et al. | Feb. 28, 1961 |
| 2,982,080 | Martin | May 2, 1961 |
| 3,012,389 | Jacobs | Dec. 12, 1961 |